United States Patent [19]
Tejfalussy

[11] Patent Number: 4,609,343
[45] Date of Patent: Sep. 2, 1986

[54] TEMPERATURE DISTRIBUTION REGULATING SAMPLE HOLDER-ADAPTER FOR FORMING CONDITIONS FOR GRADIENT HEAT TREATMENT IN HEAT TREATMENT OVENS OR FURNACES

[76] Inventor: Andras Tejfalussy, Lajos utca 115, H-1036 Budapest, Hungary

[21] Appl. No.: 667,773

[22] Filed: Nov. 2, 1984

Related U.S. Application Data

[63] Continuation-in-part of Ser. No. 566,981, Dec. 30, 1983, abandoned, which is a continuation of Ser. No. 377,253, May 11, 1982, abandoned.

[51] Int. Cl.[4] .......... F27B 1/26; G06F 15/46; G05B 23/30

[52] U.S. Cl. .......... 432/36; 364/477; 432/45; 432/55; 432/231

[58] Field of Search .......... 432/36, 45, 55, 57, 432/231, 5, 6, 253; 364/477

[56] References Cited

U.S. PATENT DOCUMENTS 4,276,603 6/1981 Beck et al. .......... 432/36

FOREIGN PATENT DOCUMENTS 2702301 7/1978 Fed. Rep. of Germany .......... 432/36

*Primary Examiner*—Henry C. Yuen
*Attorney, Agent, or Firm*—William R. Hinds

[57] ABSTRACT

The invention concerns a temperature distribution controlling sample holding adaptor for setting up gradient heat treatment conditions in heat treatment ovens, which has a sample holder for realizing temperature distribution and setting and adjustment units associated therewith, and which enables the production of the free prescribed or desired temperature range by means of heating up, maintaining the heat and cooling down. The adaptor mechanism may be combined with any known heat treatment apparatus which was not manufactured originally for gradient heat treatment purposes and by means of processors or micro-processors which may be connected thereto for controlling adjustment, controlling and recording instruments the apparatus may be operated without supervision even for more complicated treatments.

11 Claims, 7 Drawing Figures

TEMPERATURE DISTRIBUTION REGULATING SAMPLE HOLDER-ADAPTER FOR FORMING CONDITIONS FOR GRADIENT HEAT TREATMENT IN HEAT TREATMENT OVENS OR FURNACES

This application is a continuation-in-part of application Ser No. 566,981 filed Dec. 30, 1983, now abandoned, which in turn was a continuation of application Ser. No. 377,253 filed May 11, 1982, now abandoned.

The invention concerns temperature distribution regulating sample holder-adapter for forming conditions for gradient heat treatment in heat treatment furnaces.

From Hungarian Patent Specification No. 163,839 entitled 'Process and apparatus for optimising metallurgical technologies' the following optimisation process is known:

In a sample taken from a material for which the optimum heat treatment temperature is sought to be determined and/or in a medium which is in a mutually affecting relationship with the sample, there is established a temperature distribution or distributions of constant or changing gradient, then by examining the properties of the material along the gradient the most appropriate temperature distribution is determined, then the experimental heat treatment is repeated in the thus selected range, with the aid of reduced temperature gradient or gradients and by one or more such steps the optimum temperature is determined from the material the quantity of which is increased to the required size, since the space corresponding to the optimum increases as the gradient or gradients in the material samples are reduced.

From the point of view of the process the above-mentioned invention may be utilised over many fields but only a few special apparatuses are described which are employable only within narrow areas and which have to be purpose-built. One heat treatment apparatus essentially consists in the direct Joule heating of the sample body while in the other described solution a special double arrangement of the heating body is required in which one produces an inhomogeneous temperature along a given direction while the other produces a homogeneous temperature, over the same distance. Such apparatus is not at present commercially available and one cannot anticipate such availability in the near future because of the spherical heating and regulation that are required. For these reasons, the process according to the said patent, although very versatile, can scarcely be utilised at all in practice in the field of heat treatment, since the traditional heat treatment apparatuses are of totally different construction. In principle one might utilise the so-called two-zoned ovens for gradient heat treatment purposes but such ovens of small size are not normally built because of the higher investment costs, and on the other hand in such ovens a relatively large difference between the temperatures of the zones, as required for gradient heat treatment, would exert an excessive load on the walls and on the regulating instruments, or in other words in the majority of cases the required magnitudes for the gradients could not even be produced; yet in beginning the search for the optimal heat treatment temperature such large gradients are unconditionally required.

The aim of the invention is to provide apparatus which may be produced and used simply and economically and which makes it possible for the optimisation process described in Hungarian Patent Specification No. 163,839 to be used in any technology of material production or material treatment connected with heat treatment, by employing conventional heat treatment devices which were not made or intended for gradient heat treatment.

The U.S. Pat. No. 4,276,603 (Beck et al) relates to a furnace which is a production furnace for establishing diffusion process. Thermal regulation in the furnace takes place exclusively by means of zones, and said zones are of different temperatures, whereas with the equipment according to the invention regulation of temperature does not take place primarily with the aid of the zones, but by the displacement of the space or chamber containing the samples in relation to the zones, i.e. by the proper positioning thereof. As a matter of fact, the apparatus according to the invention is not a furnace but a complementary device (adaptor) to be used with furnaces, enabling the formation of a space of inhomogeneous temperature in furnaces which are designed to ensure a homogeneous temperature distribution, in the absence of an adaptor according to the invention. The equipment according to U.S. Pat. No. 4,276,603 is not at all suitable for establishing an inhomogeneous space in the sense of this invention, as its geometry is constant and it does not possess means for decreasing or increasing inhomogeneities in the optional thermal ranges or for possibilities of positioning, accordingly, it is quite unsuitable for realising the aims of the equipment according to the invention. As a contrast to the teachings of the said U.S. Pat. No. 4,276,603, with the equipment according to the invention, a temperature distribution is formed by the simultaneous and co-ordinated regulation of the zones of identical or different temperatures and of the movement of a sample holder therein, whereby the heat conductivity of the structural material of the sample holder itself as well as of the structural material of the adaptor providing the enclosing space, as well as, in a given case, the heat-extraction effect of water-cooling applied to the side lying opposite to heating, are all utilised.

The essence of the adapter according to the invention lies just in that the construction of furnaces containing different zones becomes superfluous; to the contrary, in a given case it can be well used for completing furnaces of said type.

Accordingly, the present invention relates to an adaptor i.e. to an equipment, with the aid of which inhomogeneous heat treating space can be formed for the samples to be heat-treated in the traditional furnaces ensuring homogeneous temperature distribution. Said inhomogeneous heat-treating space is formed in the inside of the sample-holder in such a manner that heat treatment is performed in the open state of the furnace door, thus outside the furnace, a cooling space while in the furnace itself a heating space will be formed In dependence on the position of the sample-holder occupied between the cooled space and the heated space, in the inside of the sample-holder temperatures are changing. The desired temperature distribution can be achieved in such a manner that the heat sensor lying on the heated side is connected to the heat regulating unit of the furnace, while the sensor arranged on the cooled side is connected to the moving unit which is connected to the sample-holder. In this manner it can be achieved that the temperature of the heated end of the sample-holder can always be kept at the desired level independently of the position of the sample-holder, while the desired temperature of the so-called cold point can be adjusted by changing the position of the sample-holder. In case of necessity, cooling of the sample holder, i.e. of the adaptor, ensuring the confining space is performed with a water-jacket.

By using the equipment, i.e. adaptor, according to the present invention, application of the process according to the said U.S. patent becomes cheaper and more simple, principally by the fact that already existing plant furnaces are rendered suitable for performing gradient heat treatment without the necessity of reconstruction. In such a manner after having performed heat treatment of said type, the furnaces can be used for their original destination.

When comparing my solution and that of said U.S. patent, it can be unambiguously stated that heat sensors are not connected to the same units. In respect of temperature measuring their task might be identical possibly they can be identically constructed; however, in respect to their role in regulation and arrangement fundamental differences can be observed: while with the solution according to the said U.S. patent they occupy a fixed position in relation to the furnace zones, with the solution according to the invention, the thermometers connected to the thermostats are fixed to the moving sample-holder i.e. to the device enclosing the same, occupying varying positions in relation to the furnace. This fact fundamentally differentiates the two solutions and confirms the fact that heat sensing according to the said U.S. patent would be absolutely unsuitable for the regulation of the adjustment of the gradients according to my invention.

As for the function of the two solutions, there is a fundamental difference, insofar as by using the adaptor according to the invention, essentially a process takes place in the course of which the temperature of the space containing the samples is kept at a relatively low and constant value, i.e. the space is cooled, while by changing the position of the adaptor, e.g. by moving it into the furnace space, the desired temperature distribution can be adjusted. That means that one end of the moving space is constantly cooled, while the other end is kept always at a high temperature and thus the temperature of the so-called cold point lying therebetween can be continuously changed in the course of moving and set to the desired temperature.

Accordingly, in operation the adaptor is allowed to move from outwards towards the heated furnace space, meanwhile the temperature of the end lying in a direction of the heated space is continuously increasing. As soon as said temperature reaches the desired level, the heat-sensing regulator attached to this end of the sample-holder decreases the furnace temperature as long as the adaptor is moving inwardly. In such a manner, the temperature of this end point is kept on a constant value. At the same time, in the course of the motion directed to the inside temperature of the other parts of the space is also continuously increased, depending on the depth of penetration of the adaptor into the heated space. This means that temperature of the cold point lying approximately in the middle of the adaptor is continuously increasing until the adaptor reaches the position at which the temperature of the cold point reaches the desired value. Now, in the samples lying between the so-called cold-point and the warm point, the desired temperature gradient will be formed. If the adaptor is used in a furnace having several zones instead of one, or in the furnace described in the said U.S. patent, by the temperature of the zones and the outer space temperature distribution can be optionally linearised. Accordingly, in an extreme case, by using the adaptor according to the invention, even homogeneous heat treatment can be performed in a furnace with inhomogeneous distribution. As will be obvious from what has been said, measurement of temperature and regulation of the temperature distribution can be realized in practice in several ways, these do not touch the essence of the invention; obviously, the solutions serving merely as examples illustrate only some of the possible realisations.

By using the solution according to the invention, a changing temperature distribution can be obtained even at temperatures above 1000° C. If it is desired to provide significant differential temperatures in the inner space of the closed sample-holder, a part of the sample-holder is to be arranged outside the furnace, simultaneously a certain additional cooling, e.g. cooling with water, is to be applied. However, the additional cooling means is always farther from the furnace opening than the so-called cold point designated by $T_{min}$. Now, if it is desired to set a temperature of, say 1000° C. at one end of the sample-holder and a lower temperature at the cold point, this can be realised in two ways. According to a first version, a furnace with one single heating zone is used and the sample-holder is adjusted so that the warm point should lie within the furnace while the cold point should lie in the vicinity of the furnace opening, in general outside thereof.

According to the other version a furnace with two heating zones is used and in one of the zones a higher temperature is set an in the other zone a lower temperature is set. The sample-holder is arranged so that the warm point should lie in the zone of elevated temperature while the cold point should lie in the zone with a lower temperature.

Optionally, temperature distribution can be controlled by the simultaneous application of the two zones with different temperatures and the external space. In such a manner, the temperature distribution can be linearised.

The role of the boat bearing a component in the diffusion furnace according to the said U.S. patent simply canot be compared with the adaptor according to the invention, as the former simply serves for transporting the components to be subjected to heat treatment through the furnace, while it is constructed in such a way and from such a material that the components contained therein should lie within a homogeneous space.

German Published Application No. 2702301 relates exclusively to temperature measuring, so it does not touch this invention in its merits, as optional solutions can be applied both for measuring and control of temperature.

The embodiments of the German specification do not bear any resemblance to the solution of my invention. The embodiments described and illustrated in the figures do not resemble either in respect to the main features or partial solutions, the present invention. The aims set for the two inventions are also quite different, as the German specification serves for the adjustment of uniform space distributions and fixed temperature courses, while the present invention serves for the programme-controlled regulation of unequal, spatially and time-wise inhomogeneous distributions. With the solution taught by the German specification, none of the sample-holders serving for receiving and moving the material samples is suitable for realising the regulation to be performed with alternating movements, i.e. for realising inhomogeneous temperature distribution in the samples.

The invention is based on the discovery that a sample holder of suitable thermal conductivity and a temperature sensor fixed to the sample holder may be utilised together with an adjustment means which enable the position of the sample holder to be controlled and adjustable relative to the edge of a given heat treatment space or chamber in accordance with the desired temperature gradient and thus such a construction could be used as an adapter for conventional heat treatment devices to render them suitable for controlling the heat or temperature distribution gradient along the sample holder according to a given mathematical function. To achieve this aim, that is to say to ensure that the sample holder adapter for regulating the temperature distribution according to the invention should control the temperature distribution in the sample holder according to the desired or prescribed gradient, the adapter includes a sample holder body made from a heat conducting material to which temperature sensor(s) is or are connected at the appropriate locations for the limiting or extreme values of the temperatures along the gradient, the temperature sensor(s) is connected to the control means or circuitry that controls the temperature in the heat treatment oven on its hot side while on its cold side the control means for controlling the position of the sample holder are connected in given cases recording and/or measuring device(s) is or are connected to the sensors for recording or measuring the temperature distribution.

In one possible preferred embodiment of the heat distribution controlling sample holder adapter a heat sensor is provided which can be displaced along the temperature gradient and which is connected with one or more regulating and temperature distribution measuring device or devices.

In another preferred embodiment of the heat distribution controlling adapter the heat sensor that can be displaced along the temperature gradient is displaced by an automatic mechanism between the high temperature point and the low temperature point in a reciprocating manner and a signal emitter (transducer) is included in the automatic mechanism for giving signals in accordance with the position of the temperature sensor.

In any of these preferred embodiments and in given cases the part of the sample holder which actually receives or accommodates the samples is disposed in the interior of a closable retort or reaction vessel which may in given cases be connected to a vacuum system or to a gas flushing system.

Naturally, the adapter may be used with any other kind of gradient heat treatment and its construction may be realised in the most varied dimensions and for the most varied temperature ranges from materials which may be known per se and which are selected and dimensioned for given operational temperatures and loads.

A preferred embodiment of the heat distribution controlling sample holder adapter according to the invention can be realised such that the temperature sensor is connected along the distance between the hot point and the cold point to one or more further regulators associated with one or more further heat treatment zones, e.g. for the purposes of linearisation of the temperature distribution, in special cases.

In an advantageous preferred embodiment the temperature sensors of the temperature distribution controlling sample holding adapter according to the invention are connected to controllers which process the signal from the temperature sensor and the hot point temperature is set by controlling the heating of one or more zones of the oven while the cold point temperature is set by a suitable positioning of the sample holder along the temperature gradient.

The invention is described in greater detail and by way of example with reference to the accompanying drawings and Examples 1 to 6.

Figure 6:
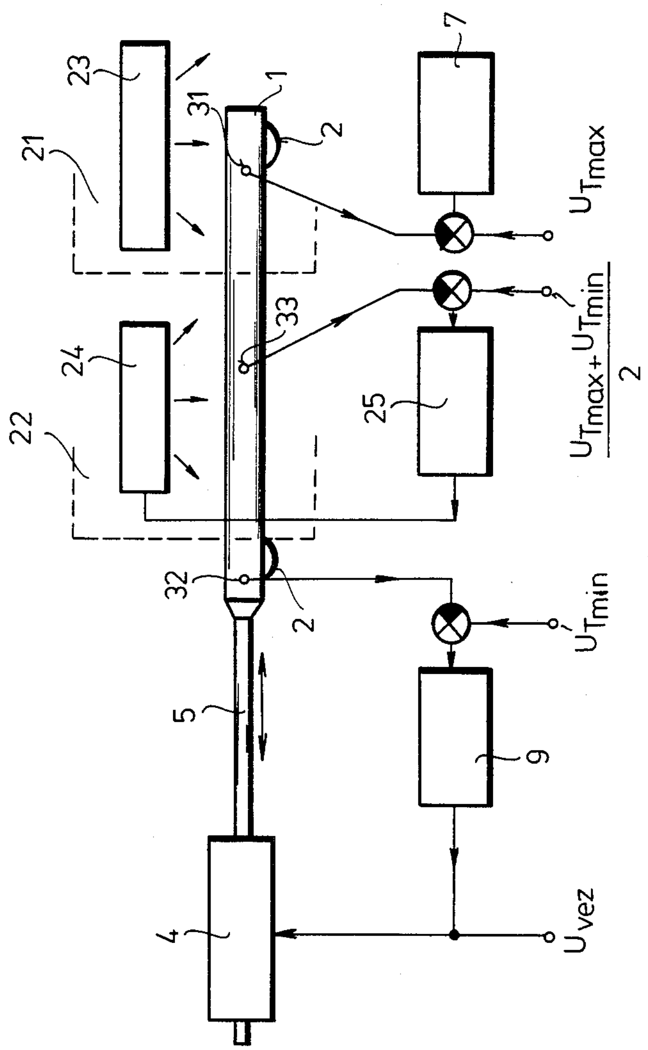
Figure 7:
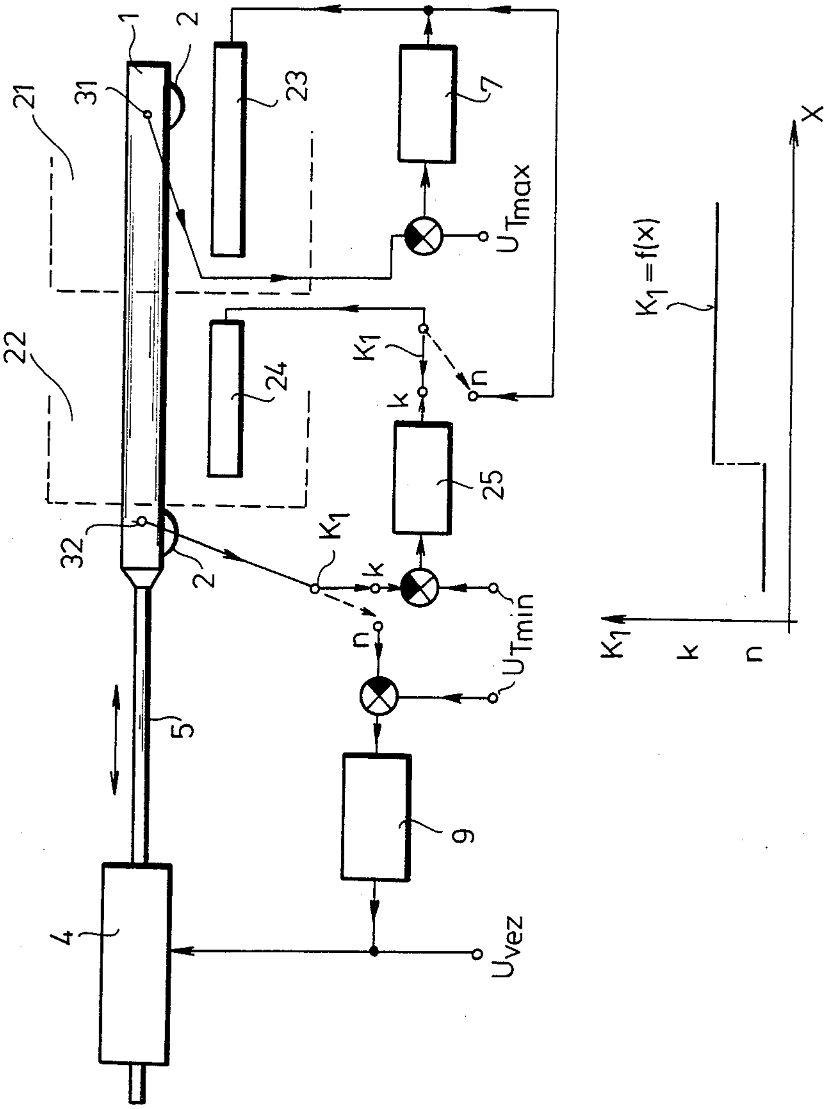

FIG. 6 is a further advantageous embodiment of the temperature distribution controlling sample holding adapter for use with a multi-zone heating heat treatment chamber and its controlling circuits, and FIG. 7 is a variant of the temperature distribution controlling sample holding adapter provided with a control mode changing switch with the aid of which temperature distributions of small or large gradients can be readily adjusted by an automatic control system.

EXAMPLE 1

Figure 1:
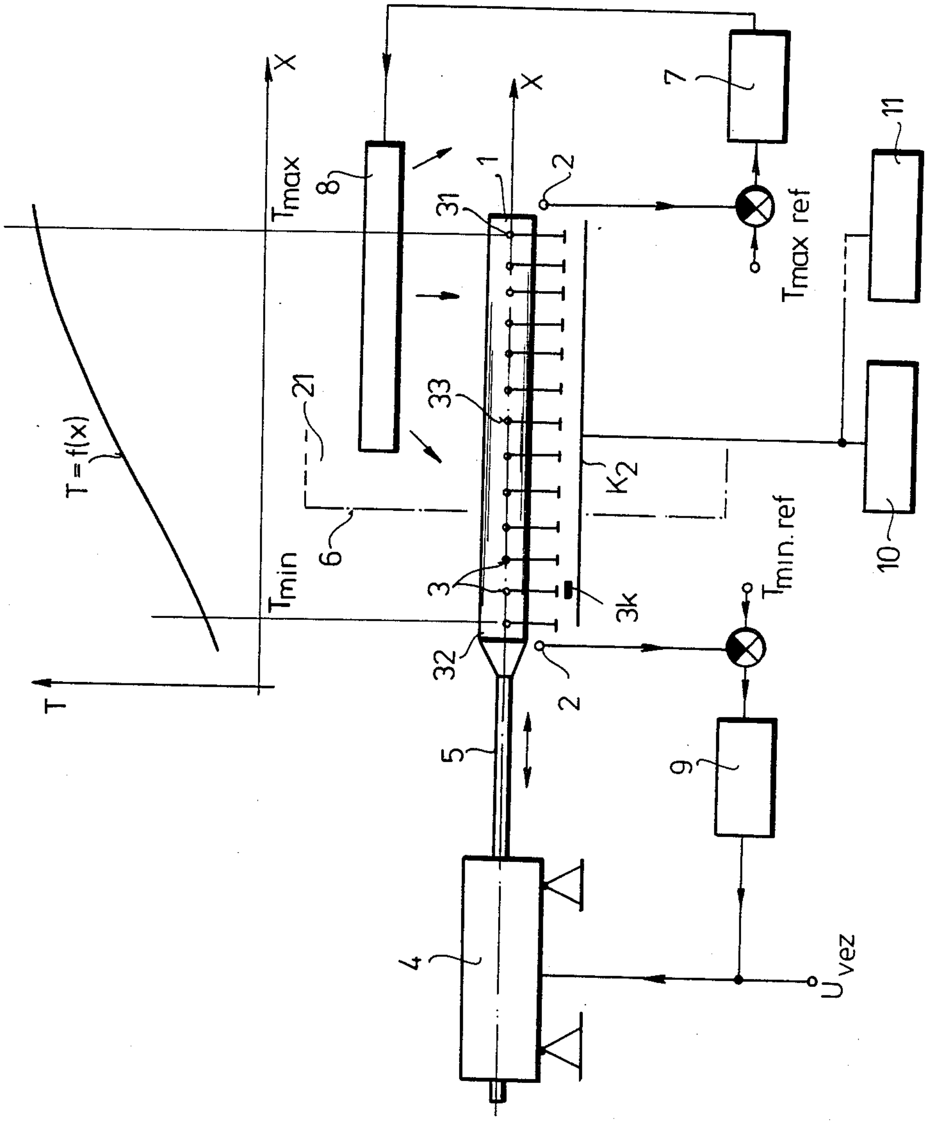
FIG. 1 shows a schematically a sample holder adapter for regulating the temperature distribution in a single zone traditional heat treatment device and for regulating the heat for the heat treatment chamber of the device.

One preferred embodiment illustrated in FIG. 1 is a construction which may be realised extremely simply. The sample holder 1 is in an oven zone 21 and can be displaced in it with the aid of a pushing or pulling element 5, as desired. By means of the pusher/puller element 5 the sample holder 1 may be moved to a greater or lesser extent inwardly or outwardly or positioned in relation to the boundary 6 between the cold and the hot parts of the oven zone 21. One or more temperature sensors 3 are connected to the sample holder 1 or to the samples on the sample holder. The temperature sensors 3 are not disposed directly in the samples but rather they are disposed in their immediate vicinity and in given cases in the sample holder 1, while the temperature sensor 3 at a warmer point along the direction x is connected to a temperature sensor 7 which controls the operation of the heating elements 8 of the oven zone 21. A temperature sensor 3 disposed at the colder point along the direction x is connected to a regulator 9 that controls the position of the sample holder 1 and the samples in it or on it within the oven zone 21 in relation to the cold/warm boundary 6; in given cases an adjustment monitoring instrument, which in given cases may be a measuring instrument 10 or 11 is connected along the direction x to the temperature sensors 3, whereby the temperature distribution along the direction x may be measured in a more accurate or more detailed manner within the sample holding device. The individual temperature sensors 3 are connected to the change-over contact $3_k$ of a switch $K_2$ in any desired order and thus to the measuring instruments 10, 11. The pushing/pulling rod 5 is actuated by a displacing device 4. As may be seen in FIG. 1, the sample holding mechanism can be displaced in a direction designated x and perpendicular to the cold-warm boundary 6 with the aid of the actuating mechanism 4 and the pushing/pulling rod 5. The temperature sensors 3 connected to the sample holder in operation measure the temperature distribution along the axis x, along the sample or samples of the sample holder 1 and these temperature sensors are displaceable together with the sample holder 1. By means of the temperature regulator 7 it can be provided that warmer point along the axis x should have a temperature which is always the same independently of the position of the sample holder for as long as the temperature sensor remains connected with the oven zone 21, i.e. remains on the side of the cold/warm boundary 6 which is adjacent the heating elements 8. The temperature sensors 3 are effective to connect the sample holder 1 either directly to the regulators 7 or 9 or via the change-over contact $3_k$ of the switch $K_2$ to various measuring instruments, for instance to the measuring instruments 10 and/or 11. By means of the controller 9 and with the aid of the actuating device 4 and the pushing/pulling rod 5 the temperature sensor 3 disposed along the cold end of the axis x a feedback system may be realised which automatically adjusts the sample holder 1 carrying the samples into position such that the temperature sensor at the colder end should sense a temperature corresponding to a preset temperature $T_{min.ref}$.

Within the possible physical and energetic limits the temperature sensors and the controllers or regulators 7 and 9 can assure an actual temperature distribution for the sample holder and the samples corresponding to the temperature distribution $T-f(x)$, along the direction x by suitably setting the upper/lower limits $T_{min}$ and $T_{max}$.

It may for example be achieved that the temperature distribution along the axis x should be constant or vary with time and that the temperature difference $T_{min}$ and $T_{max}$ should be extremely small approximating to zero or extremely large, in fact as much as more than a thousand degrees C. A varying temperature distribution may for instance be achieved by a programmed control applied to the inputs $T_{max.ref}$ and $T_{min.ref}$ of the controllers 7 and 9. This is a very favourable possibility to model physically the possible adjustments of the most varied heat treatment characteristics by a suitable selection of programmes. $U_{vez}$ is the controlling voltage for member 4.

EXAMPLE 2

Figure 2:
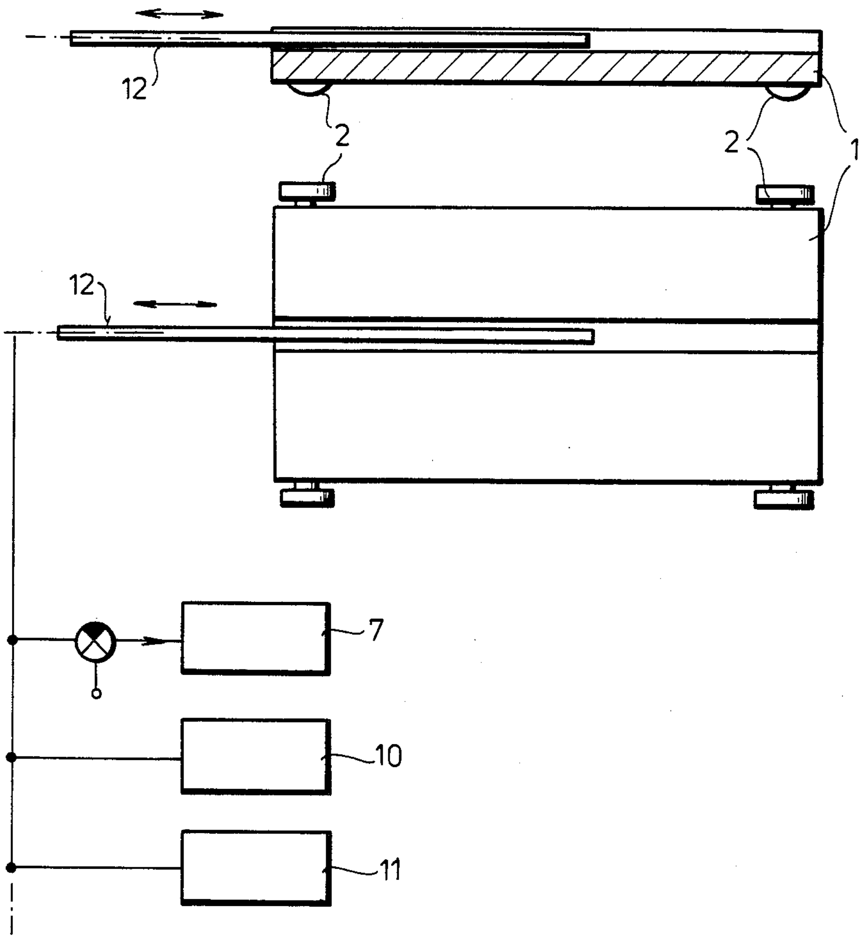
FIG. 2 illustrates the method of measuring the temperature by means of a displaceable temperator sensor in the sample holder that regulates temperature distribution, according to the invention.

FIG. 2 illustrates the sample holder 1 of the adapter illustrated in FIG. 1 but in another preferred embodiment. In this case the sensing point of the temperature sensor 12 is displaceable along the x axis independently of the position of the sample holder 1 in the oven zone 21 or of the relative position of the sensor from the cold/hot boundary 6. The elements 12 and 1 are mutually independently displaceable but naturally the possibility also arises of interposing some forced connection, such as a gear connection, with the aid of which a predetermined amount of displacement of the other component. One or more displaceable temperature sensors 12 may be built into the sample holder of the adapter 1 or directly next to the samples in the sample holder 1 which latter have a predetermined position relative to the sample holder or which are disposed in a predetermined configuration. The other possibility arises of suitably selecting the displacement programme of the displaceable temperature sensors whereby the temperature distribution along the axis x or at individual points along the axis x the temperature can be measured with the desired accuracy.

According to experiments performed the movement route of the displaceable temperature sensor may in principle be formed in the sample holder 1 in which case, however, it my happen that the construction of the sample holder becomes difficult and the very advantage of the construction of the adapter does not come to the fore, namely that the conventional heat treatment retorts or chambers can also be used. In other respects from the point of view of accuracy of temperature measurement it is more favourable when the movement path of the displaceable temperature sensor 12 is determined by means of a groove extending in the x direction and formed in the sample holder 1 or by some other guiding means along the sample holder or between the samples in the sample holder. From the point of view of manufacture this is more advantageous also because in this way the various elements of the apparatus can be built in a modular manner as independent units without depending on the method of assembly or mounting, that is to say the displaceable temperature sensor 12, the element 13 (FIG. 3) for displacing the temperature sensor 12 relative to the sample holder 1, and sensor 14 for sensing the position of the temperature sensing point in the sample holder 1 and the regulators or controllers 7, 12 and 11 connected thereto and illustrated in the drawings or other devices. The element 13 and the sensor 14 may be seen in FIG. 3 in the Example with a given sample holder 1 and a given displaceable temperature sensor 12.

EXAMPLE 3

Figure 4:
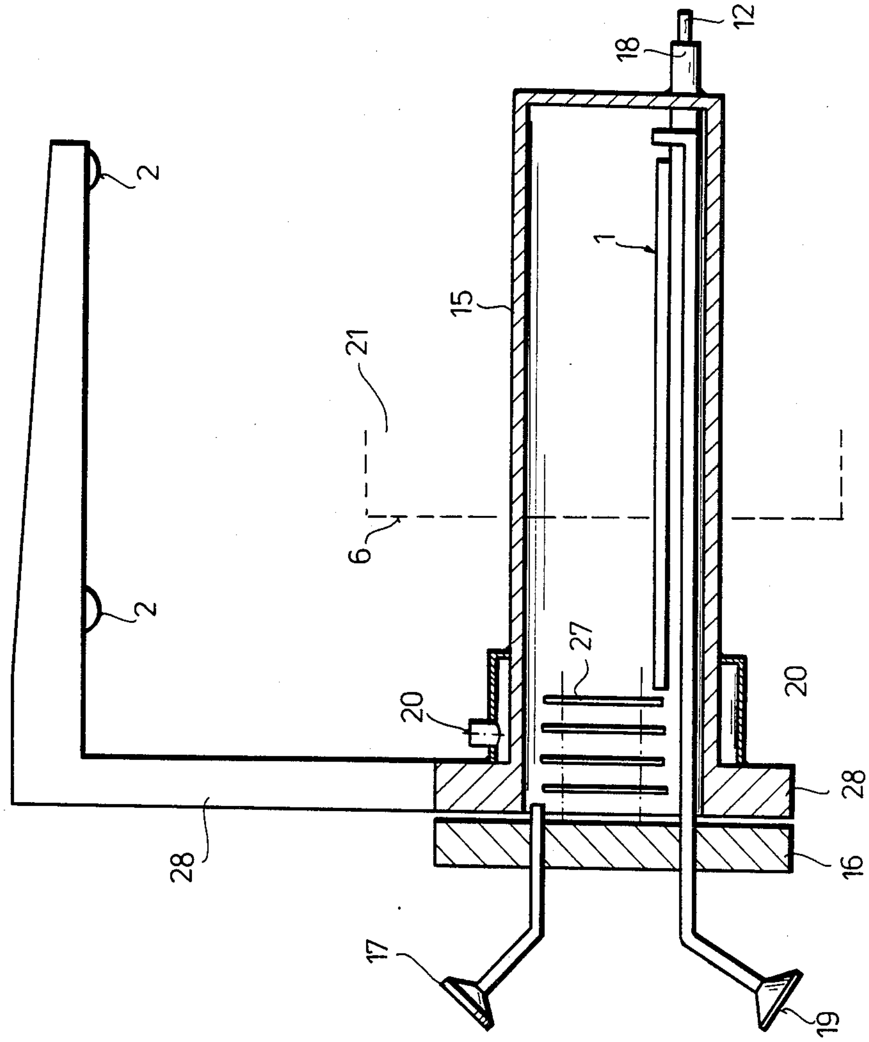
FIG. 4 shows an alternative embodiment of the construction of the temperature distribution regulating sample holding adapter, utilising a retort or reaction chamber and which is displaceable.

FIG. 4 illustrates a further possible preferred embodiment. In this case the samples disposed on the sample holder 1 in the interior of the retort or reaction chamber 15 can be isolated from the external atmosphere and the displaceable temperature sensor 12 in the retort 15 is disposed within a gas-tight cover 18 in such a manner as to be externally settable to any desired position; however, naturally, the possibility is also afforded that the construction should contain the fixed, non-displaceable temperature sensors 3 shown in FIG. 1 for determining the temperature along the axis x. There is furthermore the possibility of disposing the samples directly at the bottom part of the wall of the retort 15, that is the sample holder 1 may directly consist of the retort or reaction chamber 15. The fixed position temperature sensors 3 or the displaceable temperature sensor 12 may directly be built into the sample holder 1 but furthermore the possibility also arises of using them as an adaptor or as a partial unit or sub-assembly in the mechanism. At the rim or edge region 28 of the retort 15, water-coolers 20 and heat reflectors 27 may be disposed and in the closure rim 16 couplings 17 and 19 are provided for vacuum and for introducing a gas. To displace the construction in the retort along the axis x there is provided a guiding and suspending device 28' which is provided with wheels 2 or sliding elements to enable the suspension 28' to roll or be displaced. On the basis of experiments performed many known commercially available devices designed for normal, i.e. non-gradient type, heat treatment can be readily adapted along the lines indicated in the present invention. Thus for instance the West German firm Heraeus markets a heat treatment of a Type KR 260 E which could be used for the heat treatment zone 21 and a retort or reaction chamber also manufactured by Heraeus of the type 'Schutzgas-Retorten' may be used for forming a sample holder 1 or the displaceable heat sensor or temperature sensor 12. All that is required is that the original pipe for introducing the thermal element should be exchanged for a longer element which then extends right through the full length of the retort to place the samples and the sample holder 1 may be constituted by the interior of the retort directly in which the temperature distribution is measured by the replaced cover of the thermal element, in the cover 18, by means of the externally actuatable displaceable temperature sensor 12; advantageously this performs measurements automatically in the various positions along the axis x.

Furthermore, the original retort or reaction chamber has to be fixed on the guiding and suspending device 28' the wheels 2 of which can move on rails mounted above the oven of the type KR 260 E to assure displaceability along the axis x.

The temperature controller 7 interrupts the heating of the oven when the desired hot point temperature has been attained and enables the original temperature controller to provide the heating when a temperature falls below the prescribed value of the hot point.

The cold point temperature may be attained e.g. with the aid of the actuating device 4 which determines the position along the axis x of the suspension and guiding device 18'. In given cases this positioning can be automated by means of the controller 9 also.

Numerous other variants of existing commercial heat treatment devices can be converted on the same basis or scheme within the parameters of the mechanism of the apparatus according to the invention.

Figure 3:
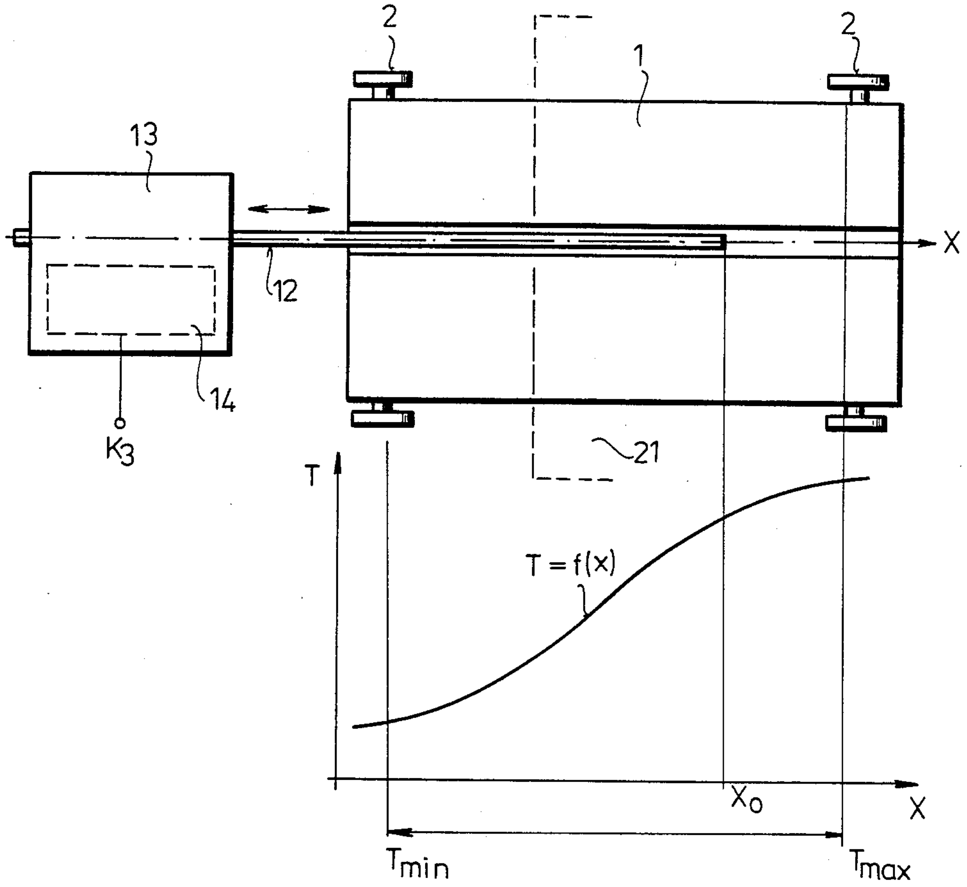
FIG. 3 illustrates an advantageous constructional embodiment in block form for the operation of the displaceable temperature sensor.
Figure 5:
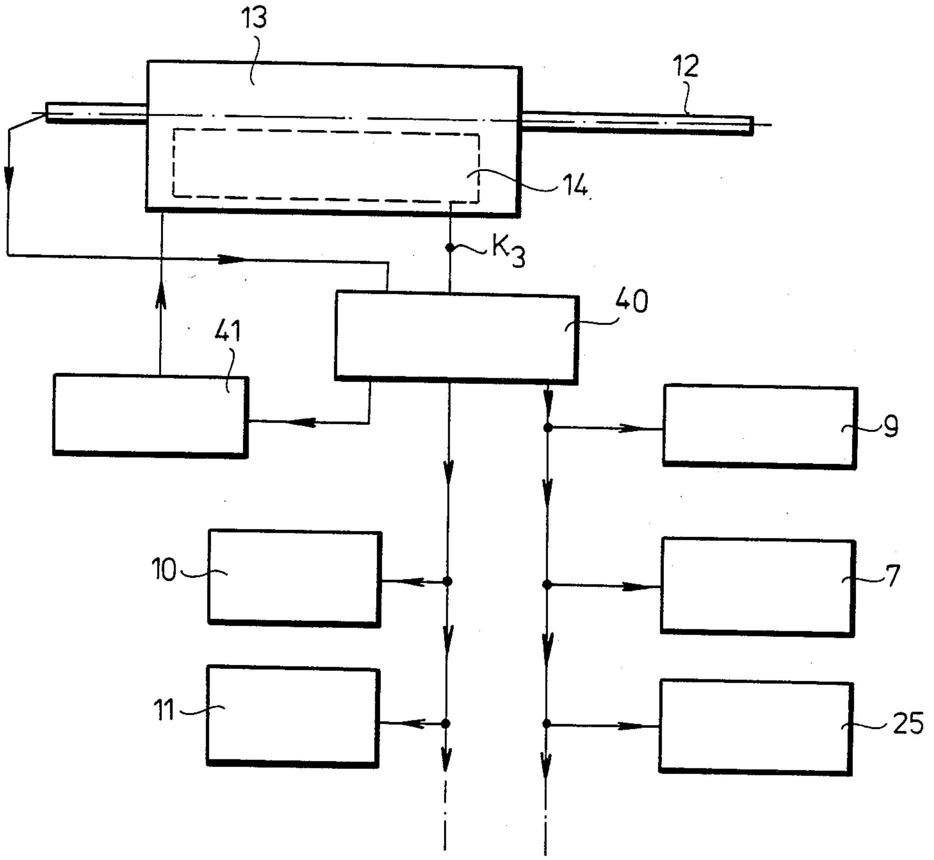
FIG. 5 is a block diagram utilising a microprocessor based automatic system for actuating the temperature sensor and passing its signal between the various controllers and measuring instruments.

The embodiment shown in FIG. 5 illustrates the control of the movable heat-sensor according to FIG. 3. The unit 13 is for putting the thermometer 12 into motion, while the unit 41 is for giving or outputting the signal resulting from the performance of moving. Control is realised in such a manner that data-collector 40 feeds the signal of a position sensor 14 with the proper sign/negative feedback into the unit 41 controlling the position. On the other hand, the data-controller 40 forwards the position signals and the electric signals of the thermometer—which are proportional with the measured temperature—to the regulators 7, 9 and 25, which utilise the electric signals appearing in the proper position and are proportional with the temperature in the course of their regulating activity, e.g. if the thermometer is in any of the positions 31, 33, 32 (see FIG. 1). In a given case, the unit 40 may be distributing the signals i.e. where it is a central processor, or microprocessor,. The unit 10 may e.g. by a digital voltmeter scaled for temperature, while the unit 11 may e.g. be a multi-channel recorder, which are also provided by the unit 40 with properly converted signals, in compliance with the comparison of the data relating to position and temperature, i.e. with the prevailing need of the single units.

In FIG. 6, the uniform version of the three regulating units of the equipment according to the invention can be seen. Out of said regulators those indicated with 7 and 9 are functioning similarly to what is shown in FIG. 1. However, with this version the equipment contains not only the heating zone 21 but also a further heating-zone 22, which is heated by heater 24, again actuated by regulator 25. The input of this regulator 25 is defined by the difference between the reference voltage formed (e.g. by averaging) from the setting signal of the regulators 7 and 9 and the voltage proportional to the temperature negatively fed back from the thermometer 33, with a function corresponding to that of the usual regulators.

In such a manner, within the limits of the physical parameters, by means of the heater 24, the temperature distribution can be regulated in further points. In a given case, the temperature distribution along the gradient can be linearised and regulated in three points.

FIG. 7 shows a further version of the embodiment according to FIG. 1. The sample-holder 1 is displaced in the direction of the X axis of the co-ordinate system illustrated in the lower part of the Figure, and in the course of the displacement one or both zones of the furnace can be switched on by means of the switch $K_1$. If the switch $K_1$ is in the position k, seen in the Figure, both heating zones are operative while if the switch $K_1$ occupies the position indicated by a broken line, only one zone of the furnace is operative. Expediently there is a forced connection between the swith $K_1$ and the sample holder 1, enabling the production of high differential temperatures between the sensing points 31 and 32 by the maximal utilisation of the output of the heaters 23 and 24. If temperature is to be adjusted within a narrower temperature range, the sample-holder 1 is moved fully into the heated space and the sensing point is switched over to the regulator 25 from the regulator 9. In such a manner adjustment of a two-zone thermal gradient becomes also possible without the necessity of exchanging or modifying the structural elements. Also, in this case, formation of the thermal gradient becomes possible by the heat extraction of the unehated (or in a given case cooled) space on the left of the measuring point 32. Linearity of temperature distribution is assured by the heat conductivity of the sample-holder.

The two kinds of regulation described above are most advantageous if in the course of searching for the optimal temperature of heat treatment, first a coarse adjustment is performed with large gradients and thereafter exact of fine adjustment of optimal temperature is performed with two-zone heating i.e. with a nearly homogeneous temperature distribution.

The excellent characteristics of the mechanism according to the invention are manifested in several areas of utilisation but particularly in the optimisation and testing methods according to Hungarian Pat. No. 163,839 when used in metal industries, ceramic industries, semi-conductor industries, telecommunications, chemicals, pharmaceutical and agricultural industries, the characteristics of which are such that they may be used not only in metallurgy but also in all technologies where there is the possibility of realising actual effects which can be expressed in one or several directions, or where the properties of the materials can be examined as a function of gradients in one or more directions. A chief advantage of the mechanism according to the invention that by means exchangeable elements it can be adapted to virtually any heat treatment apparatus, in this way the area of applicability of known heat treatment devices can be extended for determining the interrelations of the various parameters such as temperature duration, repetition frequency etc. or to investigate such interrelations or for optimising them.

A further advantage is that the number of tests required for determining these relations and thus the energy requirements of the heat treatments are reduced by an order of magnitude. A further advantage is that the utilisation of per se known computing and measuring techniques can be used to result in an inexpensive and versatile laboratory by rendering existing apparatuses intended for only a single purpose to become usable for other things. Since the components of the apparatus according to the invention are not only exchangeable but also modular, one is enabled to use the construction variant which best matches the technological requirements.

We claim:

1. Apparatus for forming the temperature gradient in environment of a workpiece arranged in a space of regulated temperature, comprising a. a furnace with housing having an input opening at one side, b. a heating element of regulatable power defining an inner zone of maximal temperature in the inner space of said furnace, c. an inner temperature sensing unit coupled with said inner zone for generating a signal corresponding to the temperature of said inner zone, d. a first regulating unit for adjusting power of said heating element according to said signals of said inner temperature sensing unit, e. an adaptor closing the inner space of said furnace by close connection with said input opening, said adaptor being pushable into said inner space through said input opening, having an outer zone of minimal temperature and including a housing made of material of high thermal conductivity surrounding the workpiece between said outer and inner zones, f. means for displacing said adaptor, g. an outer temperature sensing unit coupled with said outer zone, moving together with said adaptor for generating a signal corresponding to the temperature of said outer zone, h. a second regulating unit for adjusting displacement of said adaptor via said displacing means according to said signals of said outer temperature sensing unit and i. a steady cooling system for cooling said adaptor from the side of said outer zone by a cooling substance circulated, wherein said first regulating unit controls the temperature of said inner zone of said furnace by adjusting power of said heating element and said second regulating unit controls the temperature of said outer zone by adjusting displacement of said adaptor, for forming the temperature gradient.

2. Apparatus as claimed in claim 1, wherein said displacing means constitute a stepping motor.

3. Apparatus as claimed in claim 1, wherein said furnace is a regular shaped body defined by a longitudinal axis, wherein said heating element is arranged around and said adaptor is movable along said longitudinal axis.

4. Apparatus as claimed in claim 1, wherein there are provided auxiliary temperature sensing means for testing the temperature distribution.

5. Apparatus as claimed in claim 4, wherein said auxiliary temperature sensing means include temperature sensors arranged in a movable unit for displacing them in said inner space of said furnace.

6. Apparatus as claimed in claim 1, wherein said regulating units are connected to a programmable processor comprising program storing units for controlling the power of said heating element and the displacement of said adaptor according to a predetermined program.

7. Apparatus as claimed in claim 6, wherein said programmable processor is connected to said auxiliary temperature sensing means, to said movable unit for adjusting said temperature sensors in said inner space of said furnace and via its control output to units for registrating and/or storing data.

8. Apparatus as claimed in claim 1, wherein said adaptor is equipped with inlet, outlet and circulating means for cooling liquid, said means having pipes arranged adjacent said outer zone.

9. Apparatus as claimed in claim 1, wherein to adjust or set the displacement of said adaptor there is provided a control input which can be actuated when said regulating units are switched off or are inoperative.

10. Apparatus as claimed in claim 1, wherein said temperature sensing units are connected to said regulating units through the alternating contacts of changeover switches.

11. Apparatus as claimed in claim 1, wherein said adaptor is constituted by a retort providing with gas inlet and outlet pipes for gas required during the heat treatment.

* * * * *